United States Patent
Lauermann et al.

(10) Patent No.: US 12,241,526 B2
(45) Date of Patent: Mar. 4, 2025

(54) ECCENTRIC GEAR UNIT FOR A BRAKING FORCE GENERATOR, BRAKING FORCE GENERATOR

(71) Applicant: Robert Bosch GmbH, Stuttgart (DE)

(72) Inventors: Matthias Lauermann, Heilbronn (DE); Christoph Oehler, Karlsruhe (DE); Sebastian Martin Reichert, Affaltrach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 72 days.

(21) Appl. No.: 17/995,470

(22) PCT Filed: Sep. 28, 2021

(86) PCT No.: PCT/EP2021/076601
§ 371 (c)(1),
(2) Date: Oct. 4, 2022

(87) PCT Pub. No.: WO2022/083982
PCT Pub. Date: Apr. 28, 2022

(65) Prior Publication Data
US 2023/0167880 A1    Jun. 1, 2023

(30) Foreign Application Priority Data
Oct. 22, 2020   (DE) ...................... 10 2020 213 365.4

(51) Int. Cl.
*F16H 1/32*    (2006.01)
(52) U.S. Cl.
CPC ......... *F16H 1/32* (2013.01); *F16H 2001/323* (2013.01); *F16H 2001/325* (2013.01)

(58) Field of Classification Search
CPC . F16H 1/32; F16H 2001/323; F16H 2001/325
(Continued)

(56) References Cited

U.S. PATENT DOCUMENTS 1,767,866 A * 6/1930 Wildhaber ................ F16H 1/32
475/181
1,867,492 A * 7/1932 Braren ...................... F16H 1/32
475/168
(Continued)

FOREIGN PATENT DOCUMENTS

CN          104864040 B     10/2016
DE      102018009261 A1      5/2020
(Continued)

OTHER PUBLICATIONS

International Search Report for PCT/EP2021/076601, Issued Dec. 14, 2021.

*Primary Examiner* — Ha Dinh Ho
(74) *Attorney, Agent, or Firm* — NORTON ROSE FULBRIGHT US LLP; Gerard A. Messina

(57) ABSTRACT

An eccentric gear unit for a braking force generator. The eccentric gear unit includes an input shaft with an eccentric, which input shaft can be rotated about an axis of rotation, wherein the eccentric is mounted in a central hole of a cam which rolls on a ring gear, and wherein the cam is coupled to an output shaft which is coaxial with the input shaft, via coupling arrangement which includes at least one pin which engages in an opening of the cam. A braking force generator having an eccentric gear unit is also provided.

14 Claims, 4 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 4,604,916 | A * | 8/1986 | Distin, Jr. | ............... F16H 25/06 |
| | | | | 475/168 |
| 5,190,372 | A * | 3/1993 | Kasberger | ............ B28C 5/0837 |
| | | | | 366/47 |
| 5,290,208 | A * | 3/1994 | Minegishi | ................. F16H 1/32 |
| | | | | 475/179 |
| 5,683,323 | A * | 11/1997 | Imase | ....................... F16H 1/32 |
| | | | | 475/168 |
| 6,450,913 | B1 * | 9/2002 | Strowik | ............... B60N 2/2252 |
| | | | | 475/179 |
| 7,081,062 | B2 * | 7/2006 | Tesar | ..................... H02K 7/116 |
| | | | | 475/5 |
| 7,601,087 | B2 * | 10/2009 | Gerat | ..................... B23B 35/00 |
| | | | | 475/162 |
| 10,591,031 | B2 * | 3/2020 | Uematsu | ................. F16H 61/12 |
| 10,655,706 | B2 * | 5/2020 | Tesar | ..................... F16H 57/08 |
| 2021/0364046 | A1 * | 11/2021 | Kernbaum | ................ F16D 3/48 |

FOREIGN PATENT DOCUMENTS

| | | |
|---|---|---|
| EP | 2784347 A1 | 10/2014 |
| JP | H03244852 A | 10/1991 |
| JP | 2017022987 A | 1/2017 |
| JP | 2020085092 A | 6/2020 |

* cited by examiner

ECCENTRIC GEAR UNIT FOR A BRAKING FORCE GENERATOR, BRAKING FORCE GENERATOR

FIELD

The present invention relates to an eccentric gear unit for a braking force generator. Furthermore, the present invention relates to a braking force generator having an eccentric gear unit according to the present invention.

BACKGROUND INFORMATION

In braking force generators and braking force boosters, the latter being subsumed under the term "braking force generator" below, screw or spindle drives are used to convert a rotational movement into a translational movement. This in turn drives a piston or plunger coupled to the screw or spindle drive, so that a hydraulic pressure usable as a braking force is generated.

The rotational movement to be converted into a translational movement is generated by an electric motor. This can drive the screw or spindle drive directly or indirectly via an interposed gear unit. In particular, spur gear units or planetary gear units are used as gear units.

Electric motors become cheaper the less torque they deliver. This is because the copper windings are smaller, and smaller magnets can be used. In order to still achieve a sufficiently large output, the rotational speed is increased. In order to optimally drive the screw or spindle drive at low torque and high rotational speed, a high-ratio gear unit is required. However, this generally also increases the installation space required for the gear unit.

An object of the present invention is to provide a gear unit for a braking force generator that, on the one hand, enables large gear ratios and, on the other hand, requires little installation space. The eccentric gear unit should be able to operate with high torques and high degrees of efficiency in a small installation space. When used in a braking force generator, the gear unit should thus enable the use of a smaller electric motor.

In order to solve the problem, an eccentric gear unit having the features of present invention is provided. Advantageous developments of the present invention are disclosed herein. Furthermore, a braking force generator having an eccentric gear unit according to the present invention is provided.

SUMMARY

A proposed eccentric gear unit according to an example embodiment of the present invention includes an input shaft having an eccentric, which input shaft can be rotated about an axis of rotation A, wherein the eccentric is mounted in a central hole of a cam which rolls on a ring gear, and wherein the cam is coupled to an output shaft which is coaxial with the input shaft, via coupling means (i.e., arrangement) which comprise at least one pin which engages in an opening of the cam.

The proposed eccentric gear unit according to the present invention has—in particular in comparison to a spur gear unit—a high power density and at the same time a low installation space requirement. Furthermore, large gear ratios can be achieved, which is particularly advantageous when the proposed eccentric gear unit is used in a braking force generator, as a smaller electric motor can then be used.

With the proposed eccentric gear unit of the present invention, the cam is preferably operatively connected to the ring gear via a geometry, for example via a gear-tooth geometry or a cycloid geometry. The operative connection enables power to be transmitted from the cam to the ring gear. Very high forces can be transmitted using a gear-tooth or cycloid geometry. The gear-tooth geometry can be involute toothing, for example, but other tooth shapes are also possible. The ring gear preferably has a geometry that is the opposite of the geometry of the cam for the operative connection with the cam.

The cam of the proposed eccentric gear unit of the present invention transmits the force in a rolling manner. This means that the eccentric gear unit is preferably designed as a cycloidal gear unit. A cycloidal gear unit does not require a gear wheel for power transmission and is therefore not subject to shear forces.

It is further proposed that the at least one pin which engages in an opening of the cam is part of the input shaft or is integrally connected to the input shaft. For example, the input shaft can simultaneously form the pin, meaning that the input shaft and pin form one component. This reduces the number of parts and the assembly effort. Alternatively, the pin can form a separate component that is firmly or integrally connected to the input shaft. The separate design of the pin has the advantage that different materials can be used.

Preferably, the input shaft has a plurality of pins arranged at the same angular distance from one another. In particular, the plurality of pins may be arranged along a circular line of which the center point coincides with the axis of rotation A.

Further preferably, the cam has a plurality of openings arranged at the same angular distance from one another, wherein a pin engages in each opening. The more pins there are that engage in openings of the cam and thus come to rest against the cam, the lower the load on the cam because the load is distributed over a larger surface. However, the number of openings and thus the number of pins is limited for reasons of space. In addition, each opening leads to a weakening of the cam.

According to an example embodiment of the present invention, the size of an opening is selected such that the pin which engages therein comes to rest against the cam in a limited contact region. Outside the contact region, the pin is surrounded by a free space, which ensures that the cam can perform its rolling movements. The cross section of the openings is selected to be larger than the cross section of the pin received herein. The free space surrounding the pin is preferably maximum in a region opposite the contact region and is twice the eccentricity of the cam or eccentric. This ensures that the cam can roll on the ring gear.

In a further development of the present invention, it is provided that the at least one opening formed in the cam has an inner contour that deviates from the circular shape. In this case, the pin which engages in the opening preferably also has an outer contour that deviates from the circular shape. This measure can increase the surface contact between the pin and the cam. The increased surface contact reduces the load on the cam, since the load is distributed over a larger surface and thus the surface pressure is lower. The lower load, in turn, enables the use of less expensive materials to form the cam and/or the at least one pin. For example, plastics materials can be used to form the cam and/or the at least one pin. The material pairings may also be selected in such a way that the tribological properties are improved. Since the tribological properties have an influence on the degree of efficiency, an increase in the degree of efficiency can be achieved at the same time.

Preferably, the outer contour of the pin—leaving the necessary free space—is adapted to the inner contour of the opening receiving the pin. For example, the inner contour of the opening and the outer contour of the pin can be approximately trapezoidal or sector-shaped. These shapes enable significantly increased surface contact between the pin and the cam.

As a further developing measure of the present invention, it is also provided that the at least one pin which engages in the opening of the cam is in multiple parts and has a main body and a sliding body arranged on the main body. In this case, the main body and the sliding body can be made of different materials, which in turn enables advantageous material pairings. For example, the main body can be made of metal so that it is particularly robust, in particular capable of withstanding mechanical loads. In contrast, the sliding body that comes to rest against the cam inside the opening can be made of plastics material. The damping properties of plastics material can be used specifically to achieve a smooth load transition and dampen load peaks.

Analogous to the one-piece pin, the sliding body can also have an outer contour that deviates from the circular shape. This is preferably the case if the opening of the cam that receives the sliding body has an inner contour that deviates from the circular shape. The outer contour of the sliding body is preferably matched to the inner contour of the opening, wherein sufficient free space must remain outside a limited contact region so as not to impede the rolling movements of the cam.

Any imbalance of the eccentric can also be compensated for by an outer contour of the at least one pin or sliding body that deviates from the circular shape and an inner contour of the at least one opening of the cam that deviates from the circular shape.

Preferably, the eccentric, the cam, the ring gear, the at least one pin and/or the at least one sliding body is or are at least partially made of plastics material. The use of plastics material improves the tribological properties of the gear unit; in particular, the damping properties of plastics material can be used in a targeted manner. If the loads on a component do not permit the use of plastics material, this component can also be made of metal.

According to an example embodiment of the present invention, it is further provided that the input shaft has at least one further eccentric which is mounted in a central hole of a further cam which rolls on the ring gear, wherein the angular position of the further eccentric is offset by an angle α with respect to the angular position of the first eccentric. A further reduction in the stress on the components can be achieved by the additional cam. This does not affect the gear ratio of the gear unit. By providing two cams, the load can be halved. The load decreases further with each additional cam. This enables the use of cams which are made of plastics material. Furthermore, the use of a plurality of cams can compensate for any imbalance of an eccentric.

Since a preferred area of application for the provided eccentric gear unit is a braking force generator, a braking force generator comprising an eccentric gear unit according to the present invention for coupling an electric motor to a screw or spindle drive is also proposed. Since the eccentric gear unit has a high power density and at the same time enables large gear ratios, a smaller electric motor can be used in the braking force generator. Since the eccentric gear unit also requires only a small amount of installation space, a particularly compact braking force generator can be created. The smaller electric motor also reduces costs.

According to a preferred embodiment of the present invention, the output shaft of the eccentric gear unit forms an element to be driven of the screw or spindle drive. The element to be driven can, for example, be a spindle nut of a spindle drive. In this way, the number of parts of the braking force generator can be reduced, which in turn has a favorable effect on the installation space requirements of the braking force generator.

The present invention and its advantages are explained in more detail below with reference to the figures.

DETAILED DESCRIPTION OF EXAMPLE EMBODIMENTS

Figure 1:
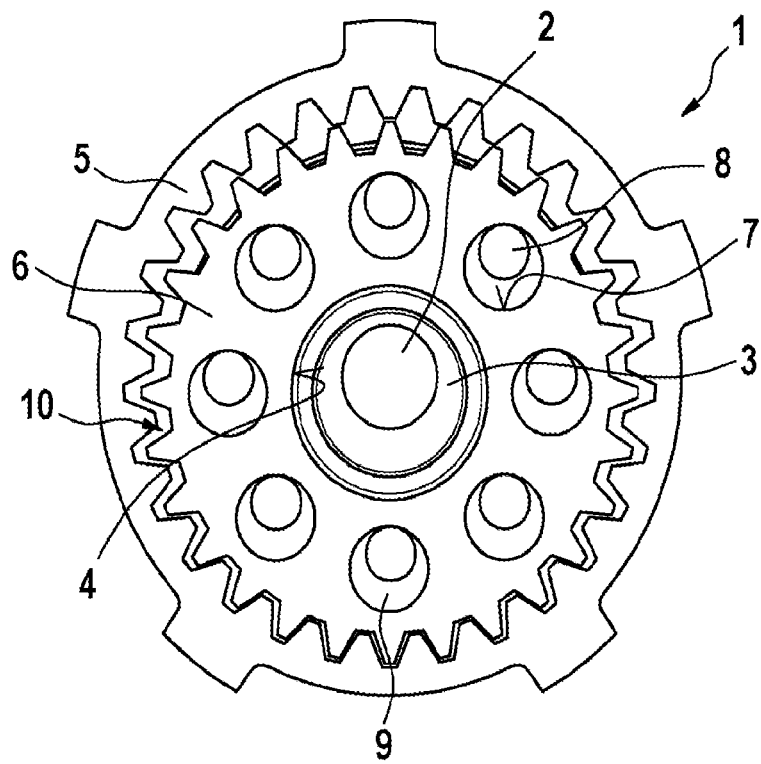
FIG. 1 is a schematic cross-sectional view through an eccentric gear unit according to the present invention in accordance with a first preferred example embodiment.

The eccentric gear unit 1 according to the present invention shown in FIG. 1 has an input shaft 2 with an eccentric 3 which is connected to the input shaft 2 for conjoint rotation. The eccentric 3 is rotatably mounted in a central hole 4 of a cam 6 which is surrounded by a ring gear 5. During operation of the eccentric gear unit 1, the cam 6 rolls on the ring gear 5. A plurality of openings 7 is formed in the cam 6, which openings are arranged at the same angular distance relative to one another around the central hole 4. Each opening 7 receives a pin 8 of which the cross section is smaller than the opening cross section of the relevant opening 7. The pins 8 thus come to rest against the cam 6 only in a limited contact region in each case, wherein the contact region moves with the rolling movement of the cam 6. In this way, the cam 6 transmits torque to an output shaft 9, which is firmly connected to the pins 8. In FIG. 1, power is transmitted from the cam 6 to the ring gear 5 via a geometry 10, which in this case is designed as a gear-tooth geometry analogous to involute toothing.

Figure 2:
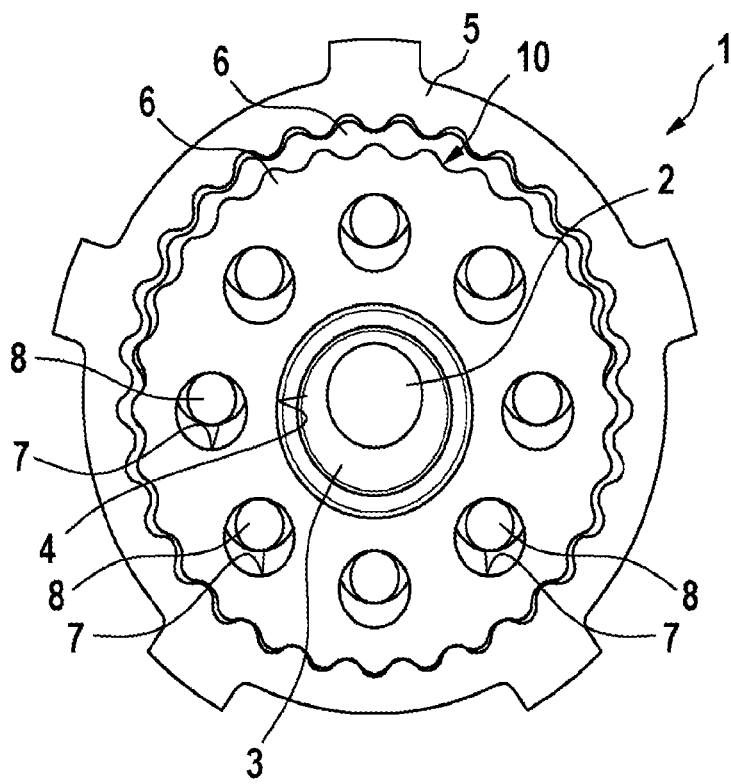
FIG. 2 is a schematic cross-sectional view through an eccentric gear unit according to the present invention in accordance with a second preferred example embodiment.
Figure 3:
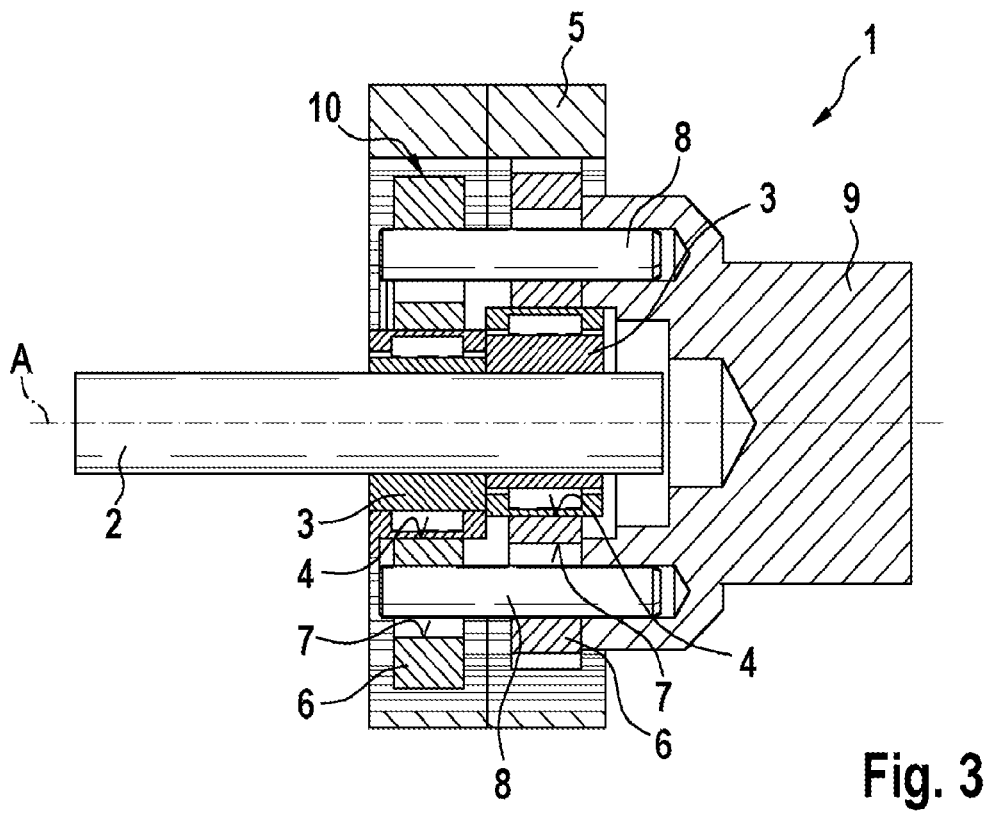
FIG. 3 shows a schematic longitudinal section through the eccentric gear unit of FIG. 2.

FIGS. 2 and 3 show a further eccentric gear unit 1 according to the present invention. This comprises two eccentrics 3 and two cams 6. In this way, the load can be reduced by half. At the same time, any imbalance of an eccentric 3 can be compensated for. For this purpose, the two eccentrics 3 are arranged axially one behind the other and offset from one another in their angular position. The same applies to the two cams 6, so that each pin 8 engages in openings 7 of the two cams 6. Thereby, the pins 8 come to rest against the two cams 6 in two opposite contact regions. The output via the pins 8 enables the input shaft 2 and the output shaft 9 to rotate about a common axis of rotation A. With the eccentric gear unit 1 of FIGS. 2 and 3, the cams 6 are also operatively connected to the ring gear 5 via an undulating geometry 10.

Figure 4:
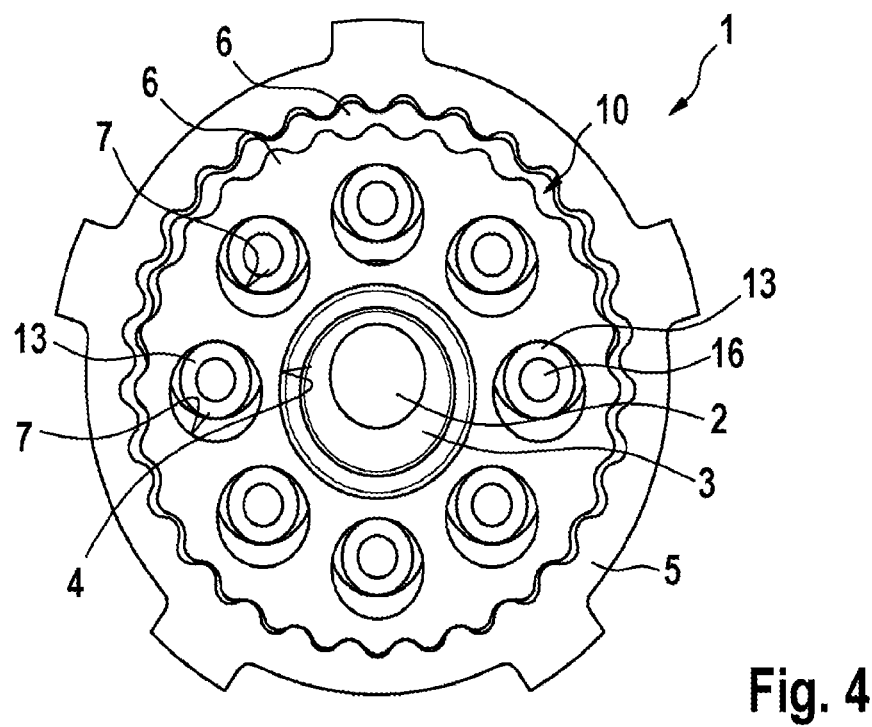
FIG. 4 is a schematic cross-sectional view through an eccentric gear unit according to the present invention in accordance with a third preferred example embodiment.

FIG. 4 shows a further preferred embodiment of an eccentric gear unit 1 according to the present invention. In contrast to the eccentric gear units 1 described above with reference to FIGS. 1 to 3, this eccentric gear unit has pins 8 in multiple parts. Each pin 8 has a main body 16 and a sliding body 13 arranged on the main body 16, via which the pin 8 engages in the relevant opening 7 of the two cams 6. The multi-part design of the pins 8 enables particularly favorable material pairings. For example, the main body 16 can be made of metal and the sliding body 13 can be made of plastics material. A damping effect can be achieved via the sliding bodies 13 made of plastics material, which minimizes load peaks. At the same time, the plastics material improves the tribological properties.

The multi-part design of the pins 8 shown in FIG. 4 can also be implemented in the eccentric gear units 1 of FIGS. 1 to 3.

Figure 5:
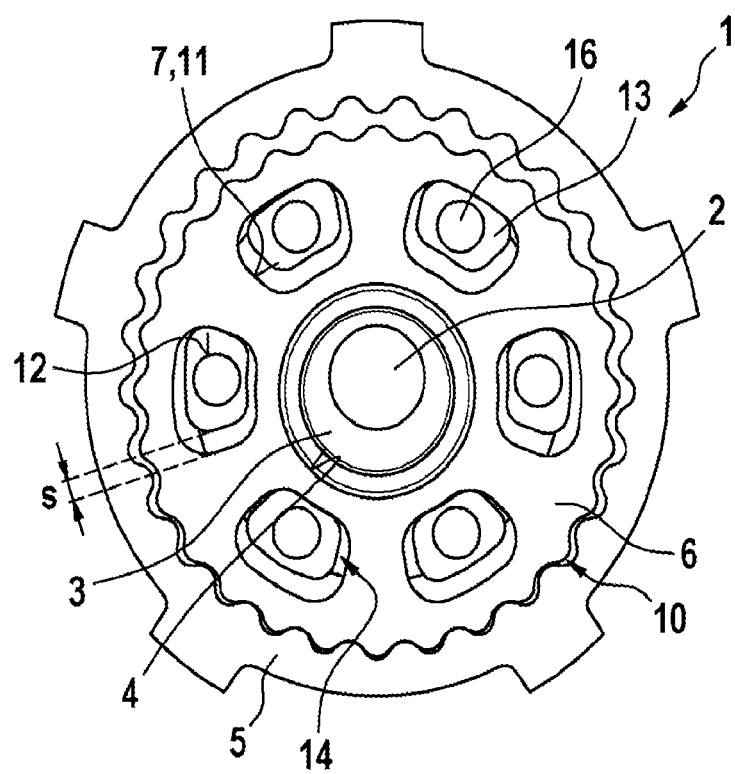
FIG. 5 is a schematic cross-sectional view through an eccentric gear unit according to the present invention in accordance with a fourth preferred example embodiment.

FIG. 5 shows a further embodiment of an eccentric gear unit 1 according to the present invention. Here as well, the pins 8 are in multiple parts. The sliding bodies 13 which engage in the openings 7 of the cam 6 in each case have an outer contour 14 that deviates from the circular shape. Thereby, the outer contour 14 of the sliding bodies 13 is adapted to an inner contour 11 of the openings 7 that deviates from the circular shape. The geometries deviating from the circular shape increase the surface contact between the pins 8 and the cam 6, which reduces the surface pressure in the region of the openings 7 and thus the load on the cam 6. The openings 7 are selected to be sufficiently large so that a gap s remains between the sliding bodies 13 and the cam 6, which ensures that the cam 6 can roll on the ring gear 5.

Figure 6:
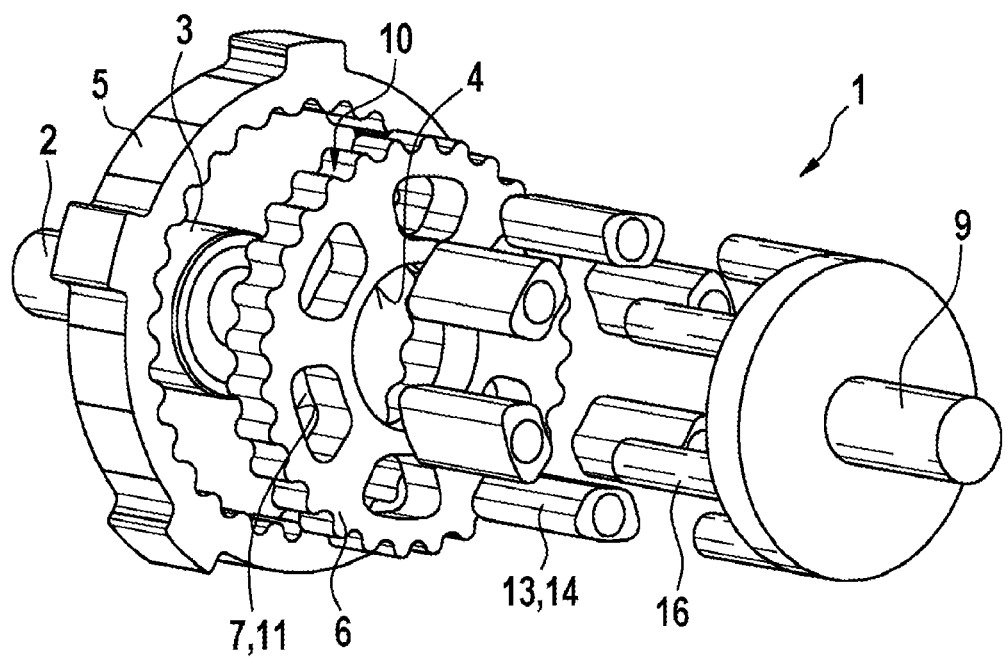
FIG. 6 is an exploded view of the eccentric gear unit of FIG. 5.
Figure 7:
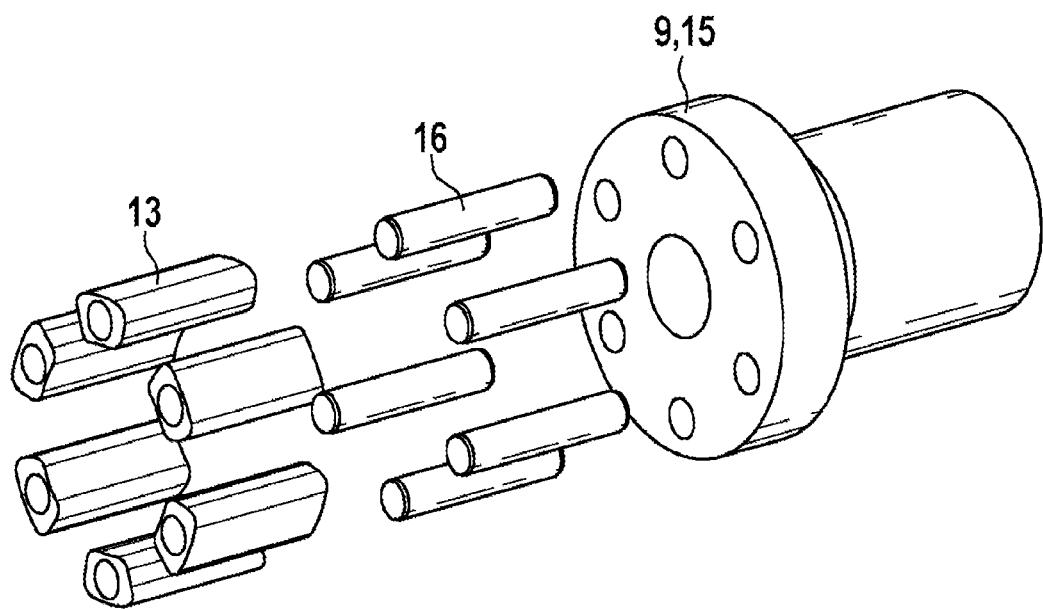
FIG. 7 is an exploded view of the output elements of an eccentric gear unit according to the present invention in accordance with a fifth preferred example embodiment.

It can be seen from FIG. 6 that, with the eccentric gear unit 1 of FIG. 5, the main bodies 16 of the pins 8 are formed in one piece with the output shaft 9. As shown by way of example in FIG. 7, this is not necessarily the case. Here, the main bodies 16 are produced separately and, once produced, are integrally connected to the output shaft 9. In FIG. 7, the output shaft 9 also forms an element 15 to be driven of a screw or spindle drive, which is not shown further. The element 15 can, for example, be a spindle nut of a spindle drive. In this way, the number of parts of the spindle drive can be reduced or the spindle drive can be simplified.

Figure 8:
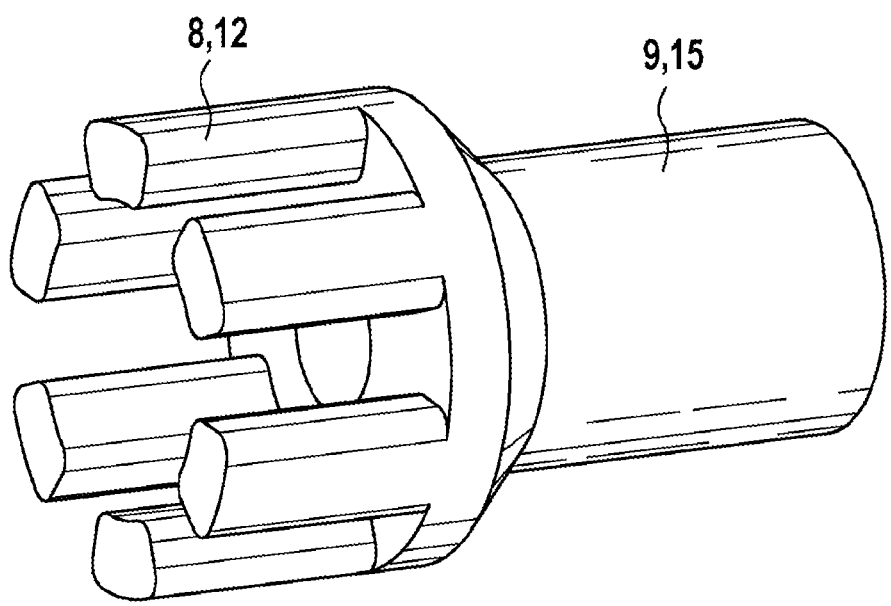
FIG. 8 is a perspective view of an output shaft for an eccentric gear unit according to an example embodiment of the present invention.

Instead of the multi-part design of the output elements shown in FIG. 7, the output elements can also be formed by a single component—as shown by way of example in FIG. 8. In FIG. 8, the output shaft 9 also forms the pins 8. The pins 8 may have a circular outer contour 12 or, according to the illustration of FIG. 8, each may have an outer contour 12 that deviates from the circular shape. In the latter case, the pins 8 engage in openings 7 of a cam 6, each of which has an inner contour 11 that deviates from the circular shape (not shown). The one-piece design of the output elements also enables the output shaft 9 to be used at the same time as the element 15 to be driven of a screw or spindle drive, which is not shown in more detail.

What is claimed is:

1. An eccentric gear unit for a braking force generator, comprising:

an input shaft having an eccentric, the input shaft being rotatable about an axis of rotation;
an output shaft that is coaxial with the input shaft
a ring gear;
a cam that is arranged to roll on the ring gear and that includes at least one opening;
wherein:
the eccentric is mounted in a central hole of the cam;
the cam is coupled to the output shaft via a coupling arrangement which includes at least one pin that each engages with the cam by extending in a respective one of the at least one opening of the cam; and
the eccentric gear unit includes at least one of the following features (I)-(II):
(I) a respective interior surface of each of one or more of the at least one opening extends perimeter-wise with a non-circular shape around a respective one of the at least one pin; and
(II) a respective exterior surface of each of one or more of the at least one pin, which faces a respective interior surface of a respective one of the at least one opening, extends perimeter-wise within the respective one of the at least one opening with a non-circular shape.

2. The eccentric gear unit according to claim 1, wherein the cam is operatively connected to the ring gear via a geometry, the geometry being a gear-tooth geometry or a cycloid geometry.

3. The eccentric gear unit according to claim 1, wherein the at least one pin is part of the output shaft or is integrally connected to the output shaft and has a plurality of pins arranged at a same angular distance from one another.

4. The eccentric gear unit according to claim 1, wherein:
the at least one pin includes a plurality of pins;
the at least one opening of the cam has a plurality of openings arranged at a same angular distance from one another; and
each of the plurality of pins engages in a respective one of the plurality of openings.

5. The eccentric gear unit according to claim 1, wherein the respective interior surface of the each of the one or more of the at least one opening extends perimeter-wise with the non-circular shape around the respective one of the at least one pin.

6. The eccentric gear unit according to claim 1, wherein the respective exterior surface of each of the one or more of the at least one pin, which faces the respective interior surface of the respective one of the at least one opening, extends perimeter-wise within the respective one of the at least one opening with the non-circular shape.

7. The eccentric gear unit according to claim 6, wherein the each of the at least one pin is formed of multiple parts that include a sliding body and an interior main body arranged within the sliding body that the respective exterior surface.

8. The eccentric gear unit according to claim 7, wherein the eccentric and/or the cam and/or the ring gear and/or the at least one pin and/or the at least one sliding body is at least partially made of a plastic material.

9. The eccentric gear unit according to claim 1, wherein the input shaft has at least one further eccentric which is mounted in a central hole of a further cam which rolls on the ring gear, wherein an angular position of the further eccentric is offset by an angle with respect to an angular position of the eccentric.

10. The eccentric gear unit according to claim 7, wherein an exterior surface of the interior main body, which faces an interior surface of the sliding body in which the interior main body is arranged, is circular.

11. The eccentric gear unit according to claim 10, wherein the exterior surface of the interior main body form fits to the interior surface of the sliding body in which the interior main body is arranged.

12. A braking force generator, comprising:
an eccentric gear unit including:
   an input shaft having an eccentric, the input shaft being rotatable about an axis of rotation;
   an output shaft that is coaxial with the input shaft
   a ring gear; and
   a cam that is arranged to roll on the ring gear and that includes at least one opening;
wherein:
   the eccentric is mounted in a central hole of the cam;
   the cam is coupled to the output shaft via a coupling arrangement which includes at least one pin that each engages with the cam by extending in a respective one of the at least one opening of the cam; and
   the eccentric gear unit is configured to couple an electric motor to a screw or spindle drive and includes at least one of the following features (I)-(II):
   (I) a respective interior surface of each of one or more of the at least one opening extends perimeter-wise with a non-circular shape around a respective one of the at least one pin; and
   (II) a respective exterior surface of each of one or more of the at least one pin, which faces a respective interior surface of a respective one of the at least one opening, extends perimeter-wise within the respective one of the at least one opening with a non-circular shape.

13. The braking force generator according to claim 12, wherein the output shaft of the eccentric gear unit forms an element to be driven of the screw or spindle drive.

14. The braking force generator according to claim 13, wherein the element to be driven is a spindle nut.

\* \* \* \* \*